Oct. 11, 1966    A. B. WILSON    3,278,220
GRAPPLE FOR INTERNALLY THREADED PIPE
Filed Jan. 6, 1965

United States Patent Office 3,278,220
Patented Oct. 11, 1966

3,278,220
GRAPPLE FOR INTERNALLY THREADED PIPE
Allen B. Wilson, deceased, late of Jackson, Miss., by Mary Pickering Wilson, executrix, Jackson, Miss., assignor to Gulf Oil Corporation, Pittsburgh, Pa., a corporation of Pennsylvania
Filed Jan. 6, 1965, Ser. No. 423,875
8 Claims. (Cl. 294—86.25)

This invention relates to an apparatus for pulling drill collars and other outside flush pipe from a well bore and for handling such pipe on a rotary drilling rig.

During rotary drilling of a well bore through subsurface rock formations, the operations of assembling and disassembling strings of drill collars and other outside flush tubular goods are performed many times. A commonly employed method of handling internally threaded pipe involves supporting the pipe in slips set in the rotary table and manually screwing an externally threaded pin connector into the internally threaded end of the pipe. The pin connector has an upwardly extending bail adapted to engage a hook suspended from the elevators of the rig lifting apparatus. That method of handling internally threaded pipe is time consuming and awkward and necessitates storing numerous threaded pins near the wellhead so that each joint of pipe can be equipped with a pin as it is raised from the well bore.

In my U.S. Patent No. 2,626,831 there is described a pipe pulling apparatus for handling internally threaded pipe. That apparatus has expansible gripping jaws actuated by expander cams connected to a mandrel that is slidable longitudinally within the jaws. Coil springs in the jaws maintain the jaws in a contracted position while the apparatus is inserted into the end of the pipe. When the mandrel is raised upwardly by the rig lifting apparatus, the cams expand the jaws into forcible engagement with the pipe threads. The pipe puller is locked in the expanded position by a spring-loaded latch that engages a circumferential notch around the mandrel.

Although the pipe puller described in my U.S. Patent No. 2,626,831 is useful in handling internally threaded pipe, it has certain disadvantages that reduces its efficiency and often add to the time expended in assembling and disassembling a string of pipe. For example, it is often necessary to insert the pipe puller into the pipe several times to engage the pipe threads because the jaws tend to pull upwardly out of the end of the pipe when the mandrel is raised and there are no means provided in that apparatus to prevent such upward movement of the jaws as they are expanded. Another disadvantage of my original apparatus is the tendency of the jaws to unscrew from the pipe as the pipe is rotated clockwise at the wellhead during the assembling of a string of pipe. A third disadvantage of my earlier apparatus is that the lever of the locking means is exposed at the upper end of the device and can be released accidentally during handling of the pipe in the ring, thereby endangering the rig personnel and the drilling equipment if the pipe falls to the rig floor.

It is therefore an object of this invention to provide a pipe pulling apparatus that engages the pipe threads effectively each time the apparatus is expanded. It is a further object of this invention to provide a pipe puller that will not unseat from the pipe while the pipe is rotated during the assembling or disassembling of the pipe string. Another object of this invention is to provide a pipe pulling apparatus that cannot be accidentally disengaged from the pipe.

The pipe pulling apparatus of this invention comprsies a plurality of externally threaded expansible gripping jaws adapted to engage the internal threads of tubular goods, coil springs normally acting to contract the jaws, a mandrel slidable within the jaws, and jaw expander cams connected to the mandrel. The apparatus also has a compression spring loosely surrounding the mandrel and acting to maintain the jaws in normally expanded condition against the action of the coil springs. A fluid compressed within a chamber having valve means counteracts the force of the compression spring to release the jaws and permit their contraction. In addition the tool has rollers or dogs adapted to prevent unscrewing of the jaws from the pipe threads when the pipe is rotated in a clockwise direction, a shear pin to permit forcible release of the pipe puller if it jams, and means for connecting the tool to the lifting apparatus of a rotary drilling rig.

An embodiment of a pipe puller designed according to the objects of this invention is illustrated in the accompanying drawings, wherein FIGURE 1 is an elevation, partly in longitudinal cross section, of the pipe puller inserted in its unexpanded condition in the end of a pipe.

Figure 1:
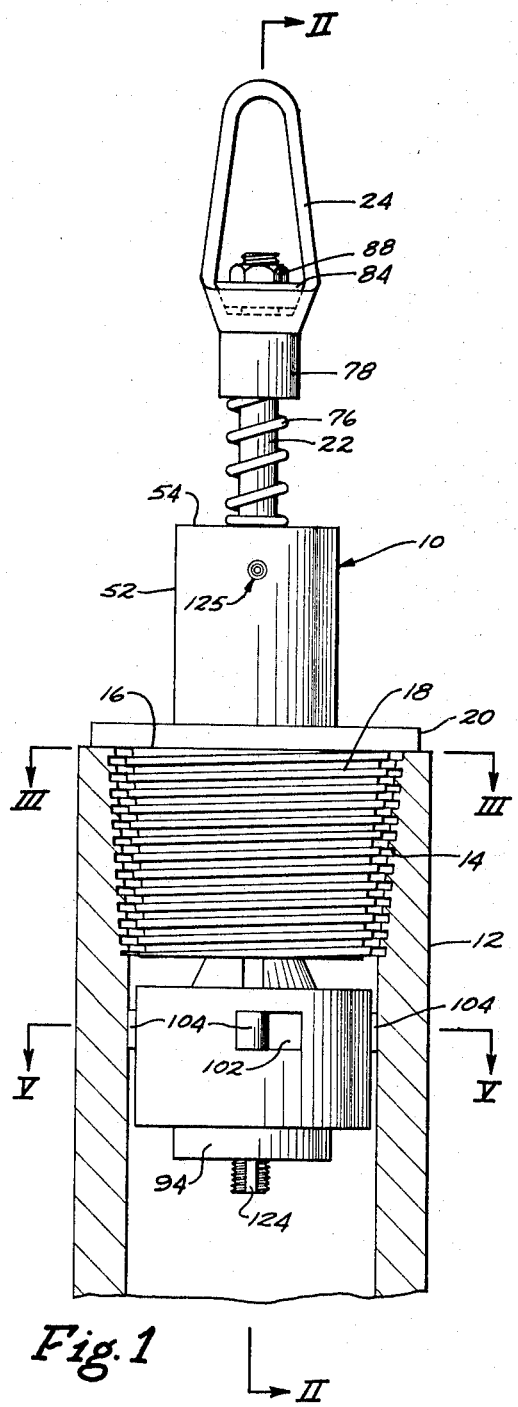

A more explicit description of the apparatus of this invention is given with reference to specific drawings. FIGURE 1 shows a pipe puller, indicated generally by reference numeral 10, inserted in the end of a pipe 12 having internal threads 14. Pipe 12 is supported in slips (not shown in the drawing) secured in the rotary table of a drilling rig. Tool 10 is shown in FIGURE 1 in the contracted condition with gripping jaws 16 having external threads 18 adapted to engage threads 14 of pipe 12 when jaws 16 are subsequently expanded. A stop plate 20 rests on the upper end of pipe 12 and prevents downward movement of tool 10 within pipe 12 past pipe threads 14. A mandrel 22 extends through tool 10, and a clevis 24, attached to the upper end of mandrel 22, is suspended from the elevators of the drilling rig.

Figure 2:
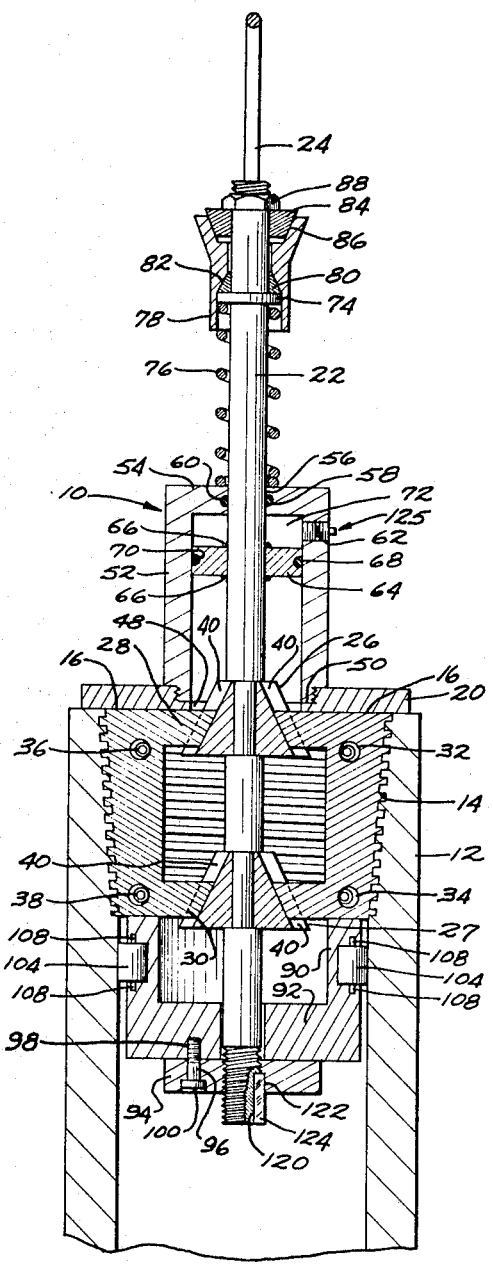
FIGURE 2 is a longitudinal cross section taken along line II—II of FIGURE 1 and showing the pipe puller expanded within the pipe end.

The tool structure is shown in more detail in FIGURE 2 where jaws 16 are shown surrounding mandrel 22. Frustoconical expander cams 26 and 27 are connected to mandrel 22, by welding or other suitable means, substantially within jaws 16. Each of jaws 16 has inwardly extending shoulders 28 and 30 at its upper and lower ends, respectively. Each of jaws 16 also has passages 32 and 34, extending arcuately through the upper and lower ends thereof, respectively, to house coil springs 36 and 38 acting yieldably to contract jaws 16 and draw them toward each other around mandrel 22.

Figure 3:
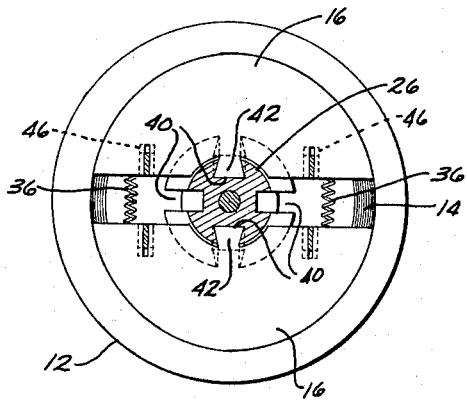
FIGURE 3 is a transverse sectional view, taken on the line III—III of FIGURE 1, showing the construction and relation of the jaws and the expander cams.

A plurality of dovetail grooves 40 are cut longitudinally along each of expander cams 26 and 27 and slidably engage similarly shaped dovetail splines 42 extending inwardly from each of shoulders 28 and 30 of jaws 16, as shown in FIGURE 3. The mating of splines 42 with grooves 40 permits expander cams 26 and 27 to slide longitudinally between jaws 16 to expand the jaws while simultaneously providing secure engagement between cams 26 and 27 and jaws 16 whereby rotational motion can be imparted to jaws 16 through mandrel 22.

Figure 4:
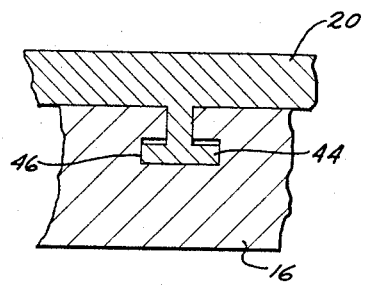
FIGURE 4 is a fragmentary view, partially in cross section, of the T-shaped members employed to suspend the jaws from the tool components superjacent the jaws.

Each of jaws 16 is suspended from stop plate 20, as is shown in FIGURE 4, by means of T-shaped projections 44 on the bottom of stop plate 20 which fit in similarly shaped slots 46 cut in the upper surface of each of the jaws. The position of T-shaped slots 46 is shown more clearly in FIGURE 3. The connection between T-shaped projections 44 and slots 46 provides support for jaws 16 and serves to guide jaws 16 as they slide outwardly along the bottom surface of stop plate 20 and are expanded into engagement with pipe threads 14.

Stop plate 20 has a central passage 48 to permit movement of mandrel 22 and expander cam 26 therethrough. Central passage 48 is defined by a circular shoulder 50 of reduced thickness in stop plate 20. A cylindrical collar 52 seats on shoulder 50 and is threadably connected to stop plate 20. Collar 52 extends upwardly from stop plate 20 around mandrel 22, and the upper end of collar 52 is partially closed by an inwardly extending shoulder 54 integral with collar 52 and having a central passage 56 for mandrel 22. An O-ring 58 is secured in a groove 60 cut in shoulder 54 around central passage 56 to provide a fluid-tight seal between shoulder 54 and mandrel 22. A threaded valve passage 62 extends through the wall of collar 52.

A circular piston 64 is attached to mandrel 22 within collar 52 by fillet welds 66, or other suitable means, and slidably engages the inner surface of collar 52. An O-ring 68 is secured within a circumferential groove 70 around the side of piston 64 to provide a fluid-tight seal between piston 64 and the inner wall of collar 52. An annular chamber 72 is defined by the combination of the upper surface of piston 64 with the inner surfaces of collar 52 and inwardly extending shoulder 54 around mandrel 22.

A bearing plate 74 is connected to mandrel 22 above shoulder 54. A compression spring 76 surrounds mandrel 22 and is compressed between shoulder 54 and bearing plate 74. Clevis 24 is rotatably mounted on mandrel 22 above bearing plate 74 with the lower end of clevis 24 extending downwardly around mandrel 22 and spring 76 to form a cylindrical sleeve 78 providing a protective cover for spring 76.

A thrust bearing 80 rests on the upper surface of bearing plate 74 around mandrel 22 and fits in a tapered seat 82 in the lower end of clevis 24. A second thrust bearing 84, at the upper end of mandrel 22, fits in a second tapered seat 86 in clevis 24. Downward movement of mandrel 22 through clevis 24 is prevented by a lock nut 88 threadably secured to the upper end of mandrel 22 adjacent thrust bearing 84, and upward movement of mandrel 22 through clevis 24 is prevented by engagement of bearing plate 74 against thrust bearing 80.

A cylindrical sleeve 90 surrounds mandrel 22 below jaws 16 and a shoulder 92, integral with sleeve 90, extends inwardly from the lower end thereof and engages mandrel 22. Mandrel 22 is threaded at its lower end below shoulder 92 to receive an adjusting nut 94 adapted to hold sleeve 90 against the bottom of jaws 16 to partially sustain the load imposed on tool 10 while lifting pipe 12. Adjusting nut 94 has a countersunk bore 96 extending vertically therethrough adapted for alignment with a threaded bore 98 in the bottom surface of shoulder 92. A threaded shear pin 100 fits in bores 96 and 98 and connects lock nut 94 to shoulder 92.

As is shown in FIGURE 2, mandrel 22 has an elongated notch 120 extending longitudinally from its bottom surface upwardly along its outer surface at the lower end of mandrel 22. Lock nut 94 has a similar upwardly extending notch 122 adapted for alignment with the notch 120 when lock nut 94 is secured around the lower end of mandrel 22. A locking pin 124 fits tightly in the aligned notches 120 and 122, thereby rigidly connecting locking nut 94 to mandrel 22.

Figure 5:
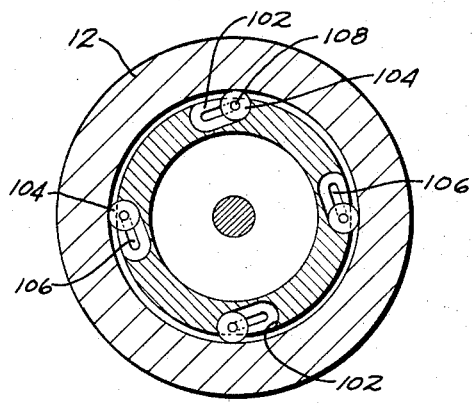
FIGURE 5 is a transverse sectional view, taken along the line V—V of FIGURE 1, showing the rollers adapted to prevent counterclockwise rotation of the pipe puller in the pipe.

As is shown in FIGURES 1 and 2, and more clearly in FIGURE 5, sleeve 90 has a plurality of recesses 102 circumferentially spaced around its outer surface. Each of recesses 102 contains a cylindrical roller 104. Elongated grooves 106 are cut in the top and bottom surfaces of recesses 102 to engage pins 108 extending from the top and bottom of each of rollers 104. The inner surface; that is, the surface nearest the longitudinal axis of the tool, of each of recesses 102 is tapered toward the outer surface of sleeve 90. The amount of taper, and the diameter of each of rollers 104, are adapted to assure that sleeve 90 can rotate in a clockwise direction with rollers 104 resting at the counterclockwise end of recess 102. However, when each of rollers 104 is at the clockwise end of its respective recess 102, roller 104 jams between the inner surface of pipe 12 and the inner surface of recess 102, thereby preventing further rotation of sleeve 90 in a counterclockwise direction relative to pipe 12.

Figure 6:
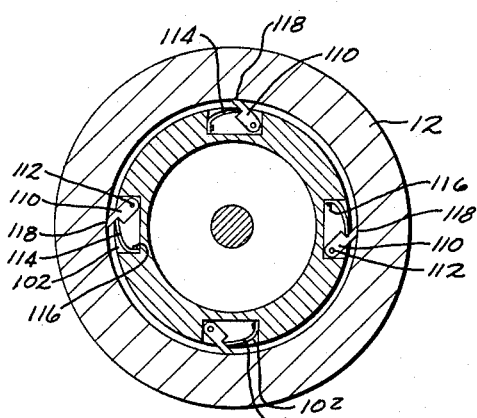
FIGURE 6 is a transverse sectional view, similar to that taken along the line V—V of FIGURE 1, showing spring-loaded dogs adapted to prevent counterclockwise rotation of the pipe puller within the pipe.

An alternative embodiment of the means to prevent unscrewing of jaws 16 from pipe threads 14 by preventing counterclockwise rotation of sleeve 90 relative to pipe 12 is shown in FIGURE 6. In that embodiment, rollers 104 are replaced by spring-loaded dogs 110 pivotally connected at 112, adjacent the shallow side wall of recess 102, to the top and bottom surfaces of recess 102. A leaf spring 114 is rigidly connected by a bolt 116, or other suitable connecting means, to the deeper side wall of recess 102 and engages the inner surface of dog 110 to yieldably force dog 110 outwardly and place end surface 118 of dog 110 in contact with the inner surface of pipe 12. End surface 118 has serrated ridges to provide effective frictional engagement with the pipe wall.

Figure 7:
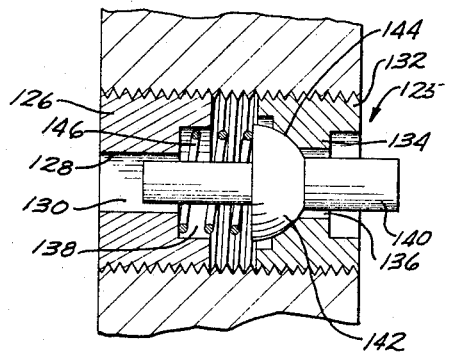
FIGURE 7 is a fragmentary view, partially in cross section, of the fluid valve mechanism indicated in FIGURES 1 and 2.

Valve passage 62 in collar 52 contains a manually operated valve 125, such as that shown in FIGURE 7, comprising a single seated, sliding stem valve having a spring-loaded bevel plug 142. An inner valve sleeve 126 is threadably secured in valve passage 62 adjacent the inner surface of collar 52 and has an inwardly extending shoulder 128 with a central passage 130 extending therethrough. An outer valve sleeve 132 is threadably secured in valve passage 62 adjacent the outer surface of collar 52 and has an inwardly extending should 134 having a central passage 136 therethrough. A spring chamber 138 is formed between shoulders 128 and 134. A valve stem 140 extends through central passages 130 and 136, and a beveled valve plug 142 is rigidly secured to stem 140 and loosely incased within spring chamber 138. The inwardly extending shoulder 134 of valve sleeve 132 has a beveled inner surface 144 adapted to engage plug 142 and provide a fluid-tight seal with plug 142.

A valve spring 146 is incased within spring chamber 138 around valve stem 140 and engages the inner surface of plug 142. Thus plug 142 is normally yieldably urged against the beveled seat 144 by spring 146. When annular chamber 72 contains a fluid, the sealing force applied to plug 142 is greater by virtue of the outwardly directed force applied by the fluid pressure. When it is desired to introduce or remove fluid from chamber 72, valve stem 140 is depressed, thereby moving plug 142 away from beveled seat 144 and into spring chamber 138 and permitting the flow of fluid through valve 125. A valve mechanism such as that described in FIGURE 7 has the advantage that fluid pressure in annular chamber 72 can be released merely by the application of manual force to valve stem 140, or by the use of a valve opening device similar to that employed to release air from an automobile tire.

In the use and operation of the apparatus of this invention, clevis 24 is attached to the elevators of a rotary rig. In that position compression spring 76 expands against shoulder 54 and bearing plate 74, thereby forcing mandrel 22 upwardly through jaws 16 and tending to displace collar 52, stop plate 20 and jaws 16 downwardly with respect to mandrel 22. As mandrel 22 moves upwardly relative to jaws 16, dovetail splines 42 on jaws 16 engage dovetail grooves 40 in cams 26 and 27 and the jaws are expanded against the action of coil springs 36 and 38. In that position, sleeve 90 with inwardly extending shoulder 92 and adjusting nut 94 are secured at the lower end of mandrel 22 with the top surface of sleeve 90 substantially in contact with the bottom of jaws 16, thereby assuring that the load lifted by tool 10 is distributed among the cam surfaces and the elements of the tool structure secured to the mandrel below the jaws.

Next locking nut 94 is rotated sufficiently in either a clockwise or a counterclockwise direction to align notch 122 in locking nut 94 with the similarly shaped notch 120 in the outer surface of mandrel 22. Then locking pin 124 is forcibly inserted into the notches to connect locking nut 94 rigidly to mandrel 22 and prevent relative motion between the locking nut and the mandrel. Next sleeve 90 and shoulder 92 are rotated to place threaded bore 98 in shoulder 92 in register with countersunk bore 96 in locking nut 94. Threaded shear pin 100 is then inserted in the aligned bores 96 and 98 to connect locking nut 94 to shoulder 92 of sleeve 90.

A fluid, such as air or water, is then injected through valve 125 into annular chamber 72 and exerts a force urging piston 64 and mandrel 22 downwardly relative to collar 52. The fluid pressure in chamber 72 also urges the collar, stop plate and jaws upwardly relative to mandrel 22 against the action of compression spring 76, and thus mandrel 22 and expander cams 26 and 27 are moved downwardly through the jaws to disengage shoulders 28 and 30 at least partly and thereby permit coil springs 36 and 38 to contract jaws 16 around mandrel 22. With jaws 16 contracted, tool 10 is inserted in the end of pipe 12. The fluid contained in chamber 72 is then released by depressing valve stem 140, and the force exerted by compression spring 76 acts against bearing plate 74 to force mandrel 22 upwardly relative to the collar, stop plate, and jaws. Cams 26 and 27 then urge shoulders 28 and 30 outwardly to expand jaws 16 into forcible engagement with pipe threads 14 while spring 76 urges stop plate 20 downwardly against the end of pipe 12. In addition to the action of compression spring 76 tending to maintain the expansion of jaws 16, the weight of pipe 12 when the pipe is lifted on the tool draws jaws 16 downwardly around cams 26 and 27, thereby maintaining the expansion of jaws 16 and assuring positive engagement of threads 18 with pipe threads 14. When pipe 12 is secured in the well head or on the rig floor, fluid is again injected into chamber 72 to release the tool.

Shear pin 100 is made of a material strong enough to withstand the torsional stresses applied thereto when pipe 12 is rotated during the assembly of a string of pipe. During such rotation of pipe 12, counterclockwise rotation of sleeve 90 is prevented by engagement of rollers 104 or spring-loaded dogs 110 with the internal surface of pipe 12. Because shear pin 100 renders sleeve 90 and shoulder 92 unitary with locking nut 94 and mandrel 22, preventing the counterclockwise rotation of sleeve 90 relative to pipe 12 also prevents the unscrewing of jaws 16 from pipe threads 14. When tool 10 jams, or when for any other reason it becomes impossible to release the tool from pipe threads 14 by ordinary means, a torsional force greater than the normally applied stresses can be applied to mandrel 22 in a counterclockwise direction. The material comprising shear pin 100 is selected so that the application of a predetermined excessive counterclockwise torsion will shear pin 100 and permit the rotation of mandrel 22 and jaws 16 in a counterclockwise direction, thereby unscrewing jaws 16 from pipe threads 14. During that operation, locking pin 124 prevents relative motion between mandrel 22 and locking 94 and thereby prevents accidental disassembly of the tool components below the jaws. Thus, when necessary, tool 10 can be forcibly unscrewed from the threads of pipe 12.

The tool as above described and employed provides many advantages over apparatus now available for handling internally threaded tubular goods on a drilling rig. Because compression spring 76 acts normally to raise mandrel 22 and expander cams 26 and 27 into engagement with jaws 16 and to force stop plate 20 downwardly against the pipe, the expansion of jaws 16 within pipe 12 does not disengage the tool from the end of the pipe. Because the tool is normally expanded to engage the pipe threads and is released only by the injection into the tool of fluid from an extraneous source the tool described in this invention cannot be accidentally released while drill collars or other pipe are being transported around the rig. Furthermore, the combination of rollers 104 or spring-loaded dogs 110 with sleeve 90, shoulder 92, shear pin 100, locking nut 94 and locking pin 124 provides a simple, effective means for preventing unscrewing of the tool from the pipe while pipe strings are being assembled or disassembled and yet provides a method for disengaging the tool should the tool jam during use.

What is claimed is:

1. In apparatus for pulling and handling pipe having internal threads in which jaws slidably mounted on a mandrel move outwardly to engage the threads of the pipe on upward movement of the mandrel relative to the jaws, the improvement comprising a stop plate encircling the mandrel and slidably secured at the upper end of the jaws to permit horizontal movement of the jaws, said stop plate extending outwardly beyond the (inner) wall of the pipe to be handled, a cylinder secured at its lower end to the stop plate and extending upwardly therefrom around the mandrel, a closure at the upper end of the cylinder having an opening therein through which the mandrel slidably extends, bearing means secured to the mandrel above the closure of the cylinder, a helical spring encircling the mandrel compressed between the bearing means and the closure, a piston mounted on the mandrel within the cylinder, means preventing leakage between the mandrel and the closure and between the piston and the cylinder wall, said cylinder adapted to receive a fluid under pressure therein above the piston to hold the mandrel in a lower position relative to the jaws, and a valve in the cylinder wall above the piston for release of fluid pressure within the cylinder.

2. In apparatus for pulling and handling pipe having internal threads in which jaws slidably mounted on a mandrel move outwardly to engage the pipe threads on upward movement of the mandrel relative to the jaws, the improvement comprising a stop plate encircling the mandrel and slidably secured to the upper end of the jaws to permit horizontal movement of the jaws, said stop plate extending outwardly beyond the wall of the pipe, a cylinder connected at its lower end to the stop plate and extending upwardly therefrom around the mandrel, an inwardly extending shoulder at the upper end of the cylinder having an opening through which the mandrel slidably extends, a piston mounted on the mandrel within the cylinder, said cylinder adapted to receive a fluid compressed therein above the piston to urge the mandrel to a lower position relative to the jaws, a valve in the cylinder wall above the piston for release of fluid pressure within the cylinder, a bearing plate connected to the mandrel above the shoulder of the cylinder, a helical spring encircling the mandrel compressed between the bearing plate and the shoulder, a sleeve encircling the mandrel below the jaws having an integral inwardly extending shoulder adapted to turn integrally with the mandrel, a plurality of grooves each extending partially around the outer surface of the sleeve, each of said grooves slanting inwardly from the outer surface of the sleeve in a counterclockwise direction, and a roller rotatably and slidably secured in each of said grooves to permit the unimpeded travel of the roller between the ends of the grooves, each roller having a diameter such that the roller engages the interior wall of the pipe and causes the mandrel to rotate integrally with the pipe as the pipe is rotated in a clockwise direction.

3. In apparatus for pulling and handling pipe having internal threads in which jaws slidably mounted on a mandrel move outwardly to engage the threads of the pipe on upward movement of the mandrel relative to the jaws, said mandrel having cams mounted thereon to engage the jaws and expand them outwardly, the improvement comprising a sleeve encircling the mandrel below the jaws, a shoulder integral with the sleeve extending inwardly therefrom adapted to rotate integrally with the mandrel, a plurality of grooves each extending partially around the outer surface of the sleeve, a pawl mounted in each of the grooves adapted to engage the interior wall of the pipe and cause the mandrel to rotate integrally with the pipe when the pipe is rotated in a clockwise direction.

4. In apparatus for pulling and handling pipe having internal threads in which jaws slidably mounted on a mandrel move outwardly to engage the pipe threads on upward movement of the mandrel relative to the jaws, the improvement comprising a sleeve encircling the mandrel below the jaws, a shoulder integral with the sleeve extending inwardly therefrom around the mandrel, a plurality of grooves each extending partially around the outer surface of the sleeve and slanting inwardly from the outer surface of the sleeve in a clockwise direction, rollers each rotatably and slidably mounted in one of the grooves, the depth of the grooves in the wall of the sleeve and the diameter of the rollers being adapted to assure that the roller jams between the inner wall of the pipe and the wall of the groove when the roller is positioned at the extreme clockwise end of the groove to cause the mandrel to rotate integrally with the pipe as the pipe is rotated in a clockwise direction, a lock nut threadably connected to the lower end of the mandrel adjacent the bottom of the sleeve shoulder, a bore extending through the lock nut from top to bottom, a second bore in the bottom surface of the shoulder positioned for alignment with the bore through the lock nut, a shear pin secured in the bores of the lock nut and shoulder, and means for locking the nut immovably to the mandrel.

5. In apparatus for pulling and handling pipe having internal threads in which jaws slidably mounted on the mandrel are moved outwardly by cams connected to the mandrel to engage the threads of the pipe upon upward movement of the mandrel relative to the jaws, the improvement comprising a sleeve encircling the mandrel below the jaws, a shoulder extending inwardly from the lower end of the sleeve and engaging the mandrel, a plurality of grooves each extending partially around the outer surface of the sleeve, a dog pivotally connected at the clockwise end of each of the grooves, each dog having an end portion adapted to frictionally engage the pipe and permit clockwise rotation of the mandrel with the pipe while preventing counterclockwise rotation of the mandrel relative to the pipe, and a spring secured in each of the grooves at the end of the groove opposite the connected end of the dog, said spring yieldably urging the dog outwardly into engagement with the wall of the pipe.

6. In apparatus for pulling and handling pipe having internal threads in which jaws are slidably mounted on a mandrel having cams extending from the mandrel to engage the jaws and move the jaws outwardly to engage the pipe threads on movement of the mandrel upwardly relative to the jaws, said apparatus also having coil springs secured to the jaws acting normally to draw the jaws inwardly toward one another around the mandrel, the improvement comprising a stop plate encircling the mandrel and slidably connected to the upper end of the jaws to permit horizontal movement of the jaws, said stop plate having a diameter greater than the inner diameter of the pipe to be handled, a cylinder connected at its lower end to the stop plate and extending upwardly therefrom around the mandrel, a closure extending inwardly from the upper end of the cylinder and slidably engaging the mandrel, a piston mounted on the mandrel within the cylinder, said cylinder adapted to receive a fluid compressed therein above the piston to urge the mandrel to a lower position relative to the jaws, a valve in the cylinder wall above the piston for release of fluid from the cylinder, a bearing plate mounted on the mandrel above the closure of the cylinder, a helical spring encircling the mandrel compressed between the bearing plate and the closure, locking means comprising pawls mounted around the mandrel below the jaws to engage the inner surface of the pipe and cause the mandrel to be rotated in a clockwise direction with the pipe while preventing counterclockwise rotation of the mandrel relative to the pipe, and a lock nut secured to the locking means and to the lower end of the mandrel.

7. In apparatus for pulling and handling pipe having internal threads in which jaws slidably mounted on a mandrel move outwardly to engage the pipe threads on upward movement of the mandrel relative to the jaws and coil springs secured to the jaws act normally to contract the jaws inwardly toward each other around the mandrel, the improvement comprising a stop plate slidably mounted on the tops of the jaws to permit horizontal movement of the jaws, said stop plate encircling the mandrel and extending outwardly beyond the wall of the pipe to be handled, a cylinder connected at its lower end to the stop plate and extending upwardly therefrom around the mandrel, a closure integral with and extending inwardly from the upper end of the cylinder having an opening therein through which the mandrel extends, means providing a fluid-tight seal between the mandrel and the closure, a piston mounted on the mandrel in slidable fluid-tight engagement with the inner wall of the cylinder, a valve in the cylinder wall above the piston, an annular chamber defined by the combination of the cylinder and closure with the piston around the mandrel, bearing means secured to the mandrel above the closure of the cylinder, a helical spring encircling the mandrel compressed between the bearing means and the closure, said annular chamber adapted to receive a fluid under pressure therein to urge the mandrel downwardly against the bias of the helical spring to a lower position relative to the jaws, locking means secured to the mandrel below the jaws to cause the mandrel to be rotated clockwise with the pipe when the pipe is so rotated and to prevent substantial counterclockwise rotation of the mandrel relative to the pipe, and a lock nut immovably connected to the mandrel and releasably secured to said locking means.

8. In apparatus for pulling and handling internally threaded pipe in which jaws are slidably mounted on a mandrel, said mandrel having cams extending outwardly therefrom to engage the jaws and move the jaws outwardly into engagement with the pipe threads upon movement of the mandrel upward relative to the jaws, the improvement comprising a stop plate encircling the mandrel and slidably secured to the upper end of the jaws to permit horizontal movement of the jaws, said stop plate extending outwardly beyond the wall of the pipe to be handled, a cylinder secured at its lower end to the stop plate and extending upwardly therefrom around the mandrel, a closure extending inwardly from the upper end of the cylinder and slidably engaging the mandrel, a piston mounted on the mandrel within the cylinder in slidable fluid-tight engagement with the inner wall thereof, an enclosed annular chamber formed by the combination of the inner surface of said cylinder and closure with the piston around the mandrel, a fluid valve in the wall of the cylinder above the piston, a bearing plate mounted on the mandrel above the closure of the cylinder, a helical spring encircling the mandrel compressed between the bearing plate and the closure, said helical spring normally acting to displace the mandrel upwardly relative to the jaws, said annular chamber adapted to receive a fluid compressed therein to urge the mandrel downwardly against the bias of the helical spring to a lower position relative to the jaws, a sleeve encircling the mandrel below the jaws having a shoulder extending inwardly from the lower end of the sleeve around the mandrel, a plurality of grooves each extending partially around the outer surface of the sleeve and slanting inwardly from the outer surface of the sleeve in a counterclockwise direction, a roller rotatably and slidably secured in each of the grooves, the depth of the grooves and the diameter of the rollers being adapted to assure that the mandrel rotates in a clockwise direction with the pipe when the pipe is so rotated and to prevent counterclockwise rotation of the mandrel relative to the pipe, a lock nut threadably secured to the lower end of the mandrel, means for connecting the nut immovably to the mandrel, and means releasably securing the lock nut to the shoulder of the sleeve.

References Cited by the Examiner
UNITED STATES PATENTS

| | | | |
|---|---|---|---|
| 2,626,831 | 1/1953 | Wilson | 294—96 |
| 2,661,979 | 12/1953 | Stone | 294—96 |

EVON C. BLUNK, *Primary Examiner.*

C. H. SPADERNA, *Assistant Examiner.*